(12) United States Patent
Wacinski et al.

(10) Patent No.: US 10,799,958 B2
(45) Date of Patent: Oct. 13, 2020

(54) MODULAR ROTARY CUTTING TOOL

(71) Applicant: Kennametal Inc., Latrobe, PA (US)

(72) Inventors: Manuel Wacinski, Bayreuth (DE); Horst Jaeger, Nuremberg (DE); Juergen Schwaegerl, Vohenstrauss (DE); Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 7 days.

(21) Appl. No.: 15/681,811

(22) Filed: Aug. 21, 2017

(65) Prior Publication Data

US 2019/0054548 A1 Feb. 21, 2019

(51) Int. Cl.
| | | |
|---|---|---|
| *B23B 51/02* | (2006.01) | |
| *B23C 5/28* | (2006.01) | |
| *B23C 5/02* | (2006.01) | |
| *B23Q 11/10* | (2006.01) | |

(52) U.S. Cl.
CPC ............... *B23B 51/02* (2013.01); *B23C 5/02* (2013.01); *B23C 5/28* (2013.01); *B23Q 11/10* (2013.01); *B23B 2251/02* (2013.01); *B23B 2251/50* (2013.01)

(58) Field of Classification Search
CPC . B23B 2251/02; B23B 2251/50; B23B 51/02; B23C 5/02; B23C 5/28; B23Q 11/10
See application file for complete search history.

(56) References Cited

U.S. PATENT DOCUMENTS

| | | |
|---|---|---|
| 22,394 A | 12/1858 | White |
| 40,297 A | 10/1863 | Wakefield |
| 44,915 A | 11/1864 | Baker |
| (Continued) | | |

FOREIGN PATENT DOCUMENTS

| | | |
|---|---|---|
| AT | 9431 B | 10/1902 |
| CN | 1160370 A | 9/1997 |
| (Continued) | | |

OTHER PUBLICATIONS

Oct. 26, 2017 International Search Report.
(Continued)

*Primary Examiner* — Sara Addisu
(74) *Attorney, Agent, or Firm* — Larry R. Meenan

(57) ABSTRACT

A modular rotary cutting tool includes a cutting head for insertion into a support. The cutting head has a coupling pin having torque surfaces and clamping surfaces formed on its outer peripheral surface. The coupling pin is divided into a front pin part and a rear pin part. The front pin part is defined by a circumferential groove. Stop surfaces for an axial pullout prevention are formed between the front pin part and the rear pin part. The torque surfaces and the clamping surfaces are arranged in different pin parts. For example, the clamping surfaces are preferably formed on the front pin part and the torque surfaces are preferably formed on the rear pin part. The clamping surfaces taper radially inward in a direction of the front cutting part at an angle of inclination, α2, with respect to the axis of rotation. Other variants and embodiments are broadly contemplated herein.

13 Claims, 11 Drawing Sheets

(56) References Cited

U.S. PATENT DOCUMENTS

| | | |
|---|---|---|
| 329,660 A | 11/1885 | Lord |
| 658,216 A | 9/1900 | Munger |
| 690,093 A | 12/1901 | Beach |
| 756,339 A | 4/1904 | Down |
| 932,071 A | 8/1909 | Urbscheit |
| 1,461,548 A | 7/1923 | West |
| 2,158,120 A | 5/1939 | Hirschberg |
| 2,289,583 A | 7/1942 | Malone |
| 2,294,969 A | 9/1942 | Engvall |
| 3,140,749 A | 7/1964 | Dionisotti |
| 3,153,356 A | 10/1964 | Dearborn |
| 3,293,727 A | 12/1966 | Simms |
| 3,359,837 A | 12/1967 | Andreasson |
| 3,410,749 A | 11/1968 | Chmiel |
| 3,434,553 A | 3/1969 | Weller |
| 3,548,688 A | 12/1970 | Kuch |
| 3,765,496 A | 10/1973 | Flores |
| 4,293,253 A | 10/1981 | Ott |
| D262,219 S | 12/1981 | Lassiter |
| D263,598 S | 3/1982 | Lassiter |
| D273,387 S | 4/1984 | Lassiter |
| D273,388 S | 4/1984 | Lassiter |
| D273,389 S | 4/1984 | Lassiter |
| D273,390 S | 4/1984 | Lassiter |
| D273,391 S | 4/1984 | Lassiter |
| D273,682 S | 5/1984 | Lassiter |
| D274,436 S | 6/1984 | Lassiter |
| 4,561,812 A | 12/1985 | Linden |
| 4,744,704 A | 5/1988 | Galvefors |
| 4,844,643 A | 7/1989 | Icks |
| 5,024,563 A | 6/1991 | Randall |
| 5,114,286 A | 5/1992 | Calkins |
| 5,154,549 A | 10/1992 | Isobe |
| 5,154,550 A | 10/1992 | Isobe |
| 5,228,812 A | 7/1993 | Noguchi |
| 5,346,335 A | 9/1994 | Harpaz |
| 5,429,199 A | 7/1995 | Sheirer |
| 5,452,971 A | 9/1995 | Nevills |
| 5,509,761 A | 4/1996 | Grossman |
| 5,634,747 A | 6/1997 | Tukala |
| 5,649,794 A | 7/1997 | Kress |
| 5,685,671 A | 11/1997 | Packer |
| 5,769,577 A | 6/1998 | Boddy |
| 5,791,838 A | 8/1998 | Hamilton |
| 5,863,162 A | 1/1999 | Karlsson |
| 5,904,455 A | 5/1999 | Krenzer |
| 5,957,631 A | 9/1999 | Hecht |
| 5,971,673 A | 10/1999 | Berglund |
| 5,980,166 A | 11/1999 | Ogura |
| 5,988,953 A | 11/1999 | Berglund |
| 5,996,714 A | 12/1999 | Massa |
| 6,012,881 A | 1/2000 | Scheer |
| 6,045,301 A | 4/2000 | Kammermeier |
| 6,059,492 A | 5/2000 | Hecht |
| 6,071,045 A | 6/2000 | Janness |
| 6,109,841 A | 8/2000 | Johne |
| 6,123,488 A | 9/2000 | Kasperik |
| 6,276,879 B1 | 8/2001 | Hecht |
| 6,447,218 B1 | 9/2002 | Lagerberg |
| 6,481,938 B2 | 11/2002 | Widin |
| 6,485,235 B1 | 11/2002 | Mast |
| 6,506,003 B1 | 1/2003 | Erickson |
| 6,514,019 B1 | 2/2003 | Schulz |
| 6,524,034 B2 | 2/2003 | Eng |
| 6,530,728 B2 | 3/2003 | Eriksson |
| 6,582,164 B1 | 6/2003 | McCormick |
| 6,595,305 B1 | 7/2003 | Dunn |
| 6,595,727 B2 | 7/2003 | Arvidsson |
| 6,626,614 B2 | 9/2003 | Nakamura |
| 6,648,561 B2 | 11/2003 | Kraemer |
| 6,840,717 B2 | 1/2005 | Eriksson |
| 7,008,150 B2 | 3/2006 | Krenzer |
| 7,048,480 B2 | 5/2006 | Borschert |
| 7,070,367 B2 | 7/2006 | Krenzer |
| 7,114,892 B2 | 10/2006 | Hansson |
| 7,125,207 B2 | 10/2006 | Craig |
| 7,134,816 B2 | 11/2006 | Brink |
| 7,189,437 B2 | 3/2007 | Kidd |
| 7,237,985 B2 | 7/2007 | Leuze |
| 7,306,410 B2 | 12/2007 | Borschert |
| 7,309,196 B2 | 12/2007 | Ruy Frota de Souza |
| 7,311,480 B2 | 12/2007 | Heule |
| 7,360,974 B2 | 4/2008 | Borschert |
| 7,377,730 B2 | 5/2008 | Hecht |
| 7,407,350 B2 | 8/2008 | Hecht |
| 7,431,543 B2 | 10/2008 | Buettiker |
| 7,467,915 B2 * | 12/2008 | de Souza ............... B23B 51/00 408/144 |
| 7,559,382 B2 | 7/2009 | Koch |
| 7,591,617 B2 | 9/2009 | Borschert |
| D607,024 S | 12/2009 | Dost |
| 7,625,161 B1 * | 12/2009 | Ruy Frota de Souza ................... B23B 51/02 407/113 |
| 7,677,842 B2 | 3/2010 | Park |
| 7,740,472 B2 | 6/2010 | Delamarche |
| 7,775,751 B2 | 8/2010 | Hecht |
| 7,832,967 B2 | 11/2010 | Borschert |
| D632,320 S | 2/2011 | Chen |
| D633,534 S | 3/2011 | Chen |
| 7,972,094 B2 | 7/2011 | Men |
| RE42,644 E | 8/2011 | Jonsson |
| 7,997,832 B2 | 8/2011 | Prichard |
| 8,007,208 B2 | 8/2011 | Noureddine |
| 8,021,088 B2 | 9/2011 | Hecht |
| 8,142,116 B2 | 3/2012 | Frejd |
| D668,697 S | 10/2012 | Hsu |
| D669,923 S | 10/2012 | Watson |
| 8,366,358 B2 | 2/2013 | Borschert |
| 8,376,669 B2 | 2/2013 | Jaeger |
| 8,430,609 B2 | 4/2013 | Frejd |
| 8,449,227 B2 | 5/2013 | Danielsson |
| 8,534,966 B2 | 9/2013 | Hecht |
| 8,556,552 B2 | 10/2013 | Hecht |
| 8,596,935 B2 | 12/2013 | Fang |
| 8,678,722 B2 | 3/2014 | Aare |
| 8,678,723 B2 | 3/2014 | Osawa |
| 8,721,235 B2 | 5/2014 | Kretzschmann |
| D708,034 S | 7/2014 | Huang |
| 8,784,018 B2 | 7/2014 | Paebel |
| 8,784,019 B2 | 7/2014 | Paebel |
| D711,719 S | 8/2014 | DeBaker |
| 8,807,888 B2 | 8/2014 | Borschert |
| 8,882,413 B2 | 11/2014 | Hecht |
| 8,931,982 B2 | 1/2015 | Osawa |
| 8,992,142 B2 | 3/2015 | Hecht |
| 9,028,180 B2 | 5/2015 | Hecht |
| 9,050,659 B2 | 6/2015 | Schwaegerl et al. |
| 9,073,128 B2 | 7/2015 | Mack |
| 9,079,255 B2 | 7/2015 | Jager |
| 9,162,295 B2 | 10/2015 | Paebel |
| D742,714 S | 11/2015 | King, Jr. |
| D742,948 S | 11/2015 | Kenno |
| 9,180,650 B2 | 11/2015 | Fang |
| 9,205,498 B2 | 12/2015 | Jaeger |
| 9,248,512 B2 | 2/2016 | Aare |
| 9,296,049 B2 | 3/2016 | Schwaegerl |
| 9,302,332 B2 | 4/2016 | Scanlon |
| 9,371,701 B2 | 6/2016 | Cox |
| 9,481,040 B2 | 11/2016 | Schwaegerl |
| 9,498,829 B2 | 11/2016 | Zabrosky |
| D798,921 S | 10/2017 | Frota de Souza Filho |
| D798,922 S | 10/2017 | Frota de Souza Filho |
| 10,213,845 B2 * | 2/2019 | Schwagerl .............. B23B 51/02 |
| 2001/0033780 A1 | 10/2001 | Berglund |
| 2002/0159851 A1 | 10/2002 | Krenzer |
| 2002/0168239 A1 | 11/2002 | Mast |
| 2002/0195279 A1 | 12/2002 | Bise |
| 2003/0039523 A1 | 2/2003 | Kemmer |
| 2003/0091402 A1 | 5/2003 | Lindblom |
| 2004/0240949 A1 | 12/2004 | Pachao-Morbitzer |
| 2005/0084352 A1 | 4/2005 | Borschert |
| 2005/0135888 A1 | 6/2005 | Stokey |
| 2006/0072976 A1 | 4/2006 | Frota de Souza |

(56) References Cited

U.S. PATENT DOCUMENTS

| | | |
|---|---|---|
| 2006/0093449 A1 | 5/2006 | Hecht |
| 2008/0003072 A1 | 1/2008 | Kim |
| 2008/0175676 A1 | 7/2008 | Prichard |
| 2008/0175677 A1 | 7/2008 | Prichard |
| 2008/0181741 A1 | 7/2008 | Borschert |
| 2008/0193231 A1 | 8/2008 | Jonsson |
| 2008/0193237 A1 | 8/2008 | Men |
| 2009/0044986 A1 | 2/2009 | Jaeger |
| 2009/0067942 A1 | 3/2009 | Tanaka |
| 2009/0071723 A1 | 3/2009 | Mergenthaler |
| 2009/0116920 A1 | 5/2009 | Bae |
| 2009/0123244 A1 | 5/2009 | Buettiker |
| 2009/0311060 A1 | 12/2009 | Frejd |
| 2010/0021253 A1 | 1/2010 | Frejd |
| 2010/0092259 A1 | 4/2010 | Borschert |
| 2010/0143059 A1 | 6/2010 | Hecht |
| 2010/0247255 A1 | 9/2010 | Nitzsche |
| 2010/0266357 A1 | 10/2010 | Kretzschmann |
| 2010/0272529 A1 | 10/2010 | Rozzi |
| 2010/0307837 A1 | 12/2010 | King |
| 2010/0322723 A1 | 12/2010 | Danielsson |
| 2010/0322728 A1 | 12/2010 | Aare |
| 2010/0322729 A1 | 12/2010 | Päbel |
| 2010/0322731 A1 | 12/2010 | Aare |
| 2011/0020072 A1 | 1/2011 | Chen |
| 2011/0020073 A1 | 1/2011 | Chen |
| 2011/0020077 A1 | 1/2011 | Fouquer |
| 2011/0020086 A1 | 1/2011 | Borschert |
| 2011/0027021 A1 | 2/2011 | Nelson |
| 2011/0081212 A1 | 4/2011 | Spichtinger |
| 2011/0097168 A1 | 4/2011 | Jager |
| 2011/0110735 A1 | 5/2011 | Klettenheimer |
| 2011/0110739 A1 | 5/2011 | Frisendahl |
| 2011/0168453 A1 | 7/2011 | Kersten |
| 2011/0229277 A1 | 9/2011 | Hoffer |
| 2011/0236145 A1 | 9/2011 | Paebel |
| 2011/0299944 A1 | 12/2011 | Hoefermann |
| 2011/0318128 A1 | 12/2011 | Schwaegerl |
| 2012/0003056 A1 | 1/2012 | Jaeger |
| 2012/0014760 A1 | 1/2012 | Glimpel |
| 2012/0082518 A1 | 4/2012 | Woodruff |
| 2012/0087746 A1 | 4/2012 | Fang |
| 2012/0087747 A1 | 4/2012 | Fang |
| 2012/0099937 A1 | 4/2012 | Osawa |
| 2012/0121347 A1 | 5/2012 | Osawa |
| 2012/0308319 A1 | 12/2012 | Sampath |
| 2012/0315101 A1 | 12/2012 | Osawa |
| 2013/0183107 A1 | 7/2013 | Fang |
| 2013/0183112 A1 | 7/2013 | Schwagerl |
| 2013/0209189 A1 | 8/2013 | Borschert |
| 2013/0223943 A1 | 8/2013 | Gey |
| 2013/0259590 A1 | 10/2013 | Shaheen |
| 2013/0266389 A1 | 10/2013 | Hecht |
| 2014/0023449 A1 | 1/2014 | Jonsson |
| 2014/0255115 A1 | 9/2014 | Zabrosky |
| 2014/0255116 A1 | 9/2014 | Myers |
| 2014/0301799 A1 | 10/2014 | Schwaegerl et al. |
| 2014/0321931 A1 | 10/2014 | Gey |
| 2014/0348602 A1 | 11/2014 | Schwaegerl |
| 2015/0063926 A1 | 3/2015 | Wu |
| 2015/0063931 A1 | 3/2015 | Wu |
| 2015/0104266 A1 * | 4/2015 | Guter ............... B23B 51/02 408/230 |
| 2015/0174671 A1 | 6/2015 | Maurer |
| 2015/0266107 A1 | 9/2015 | Gonen |
| 2015/0273597 A1 | 10/2015 | Aliaga |
| 2015/0298220 A1 | 10/2015 | Ach |
| 2015/0321267 A1 | 11/2015 | Takai |
| 2015/0328696 A1 | 11/2015 | Wang |
| 2016/0001379 A1 | 1/2016 | Kauper |
| 2016/0001381 A1 | 1/2016 | Lach |
| 2016/0016236 A1 | 1/2016 | Evans |
| 2016/0031016 A1 | 2/2016 | Takai |
| 2016/0059323 A1 | 3/2016 | Riester |
| 2016/0207122 A1 | 7/2016 | Chen |
| 2016/0229017 A1 | 8/2016 | Guy |
| 2016/0263663 A1 | 9/2016 | Schwaegerl |
| 2016/0263664 A1 | 9/2016 | Son |
| 2016/0263666 A1 | 9/2016 | Myers |
| 2016/0311035 A1 * | 10/2016 | Peng ............... B23B 51/02 |
| 2017/0028480 A1 | 2/2017 | Schwaegerl et al. |
| 2017/0100784 A1 | 4/2017 | Frota de Souza Filho |

FOREIGN PATENT DOCUMENTS

| | | |
|---|---|---|
| CN | 1204976 A | 1/1999 |
| CN | 1258240 A | 6/2000 |
| CN | 2438535 | 7/2001 |
| CN | 1616170 A | 5/2005 |
| CN | 1689740 A | 11/2005 |
| CN | 101048251 A | 10/2007 |
| CN | 100455390 | 1/2009 |
| CN | 101605622 A | 12/2009 |
| CN | 101610866 A | 12/2009 |
| CN | 102006958 A | 4/2011 |
| CN | 102307693 A | 1/2012 |
| CN | 102310214 A | 1/2012 |
| CN | 104588739 A | 5/2015 |
| CN | 104759664 A | 7/2015 |
| CN | 204545517 | 8/2015 |
| CN | 204565232 | 8/2015 |
| CN | 106825693 A | 6/2017 |
| DE | 94340 | 9/1896 |
| DE | 384720 | 11/1923 |
| DE | 524677 | 5/1931 |
| DE | 118806 | 9/1984 |
| DE | 3733298 | 4/1992 |
| DE | 19605157 | 9/1996 |
| DE | 19543233 | 5/1997 |
| DE | 29809638 | 8/1998 |
| DE | 19945097 | 3/2001 |
| DE | 20204848 | 6/2002 |
| DE | 102004022747 A1 | 11/2005 |
| DE | 102007044095 A1 | 3/2009 |
| DE | 112009002001 T5 | 2/2013 |
| DE | 102012200690 A1 | 7/2013 |
| DE | 102012212146 A1 | 1/2014 |
| DE | 102013205889 | 5/2014 |
| DE | 102013209371 A1 | 11/2014 |
| DE | 102015106374 A1 | 10/2016 |
| EP | 118806 | 9/1984 |
| EP | 0599393 | 2/1996 |
| EP | 1136161 | 9/2001 |
| EP | 813459 | 7/2003 |
| EP | 1476269 | 10/2009 |
| EP | 2361708 | 8/2011 |
| EP | 1996358 | 11/2011 |
| EP | 2524755 | 11/2012 |
| EP | 2551046 A1 | 1/2013 |
| FR | 907980 | 3/1946 |
| GB | 17961 | 12/1915 |
| GB | 1395855 | 5/1975 |
| JP | S5537209 A | 3/1980 |
| JP | H05301104 A | 11/1993 |
| JP | 11019812 A | 1/1999 |
| JP | 2002501441 A | 1/2002 |
| JP | 2002113606 A | 4/2002 |
| JP | 2003291044 A | 10/2003 |
| JP | 2004255533 A | 9/2004 |
| JP | 2005118940 | 5/2005 |
| JP | 2005169542 | 6/2005 |
| JP | 2006167871 A | 6/2006 |
| JP | 2008500195 A | 1/2008 |
| JP | 2011036977 A | 2/2011 |
| JP | 6211769 | 9/2017 |
| WO | WO8403241 | 8/1984 |
| WO | WO1984003241 | 8/1984 |
| WO | WO9627469 | 9/1996 |
| WO | WO9853943 | 12/1998 |
| WO | WO03031104 | 4/2003 |
| WO | WO2007107294 | 9/2007 |
| WO | WO2008072840 | 6/2008 |
| WO | WO2008099378 A1 | 8/2008 |
| WO | WO2009128775 | 10/2009 |

(56) References Cited

FOREIGN PATENT DOCUMENTS

| WO | WO2010102793 A1 | 9/2010 |
| WO | WO2014091477 | 6/2014 |
| WO | WO2015064904 A1 | 5/2015 |

OTHER PUBLICATIONS

Jun. 6, 2018 Office Action.
Mar. 6, 2018 First office action.
Jan. 11, 2018 First Office Action.
Dec. 29, 2017 Office action (3 months).
Dec. 18, 2017 Second Office Action.
Nov. 22, 2017 First office action.
Nov. 17, 2017 First Office Action.
Apr. 12, 2016 Second Office Action.
Mar. 22, 2017 First office action.
Dec. 8, 2015 Office action (3 months).
Nov. 6, 2015 Final Office Action.
Sep. 2, 2015 First office action.
Jul. 16, 2015 International Search Report Transmitted.
Oct. 12, 2015 First office action.
Jul. 7, 2015 Office action (3 months).
Mar. 23, 2016 First office action.
Nov. 19, 2018 Office Action.
Sep. 13, 2018 Office Action.
Aug. 28, 2018 Office Action.
Jul. 24, 2018 Office Action.
Jun. 5, 2018 Office Action.
Dec. 1, 2017 Second Office Action.
Sep. 19, 2017 Final Office Action.
Sep. 6, 2017 Final Office Action.
Jul. 14, 2017 Office action (3 months).
Jun. 27, 2017 Office action (3 months).
May 25, 2017 Office action (3 months).
May 9, 2017 Second Office Action.
Apr. 19, 2017 First Office Action.
Apr. 6, 2017 Second Office Action.
Apr. 6, 2017 First office action.
Apr. 1, 2017 First Office Action.
Mar. 21, 2017 Office action (3 months).
Mar. 10, 2017 Office action (3 months).
Dec. 30, 2016 Final Office Action.
Nov. 23, 2016 Final Office Action.
Feb. 25, 2020 International preliminary report on patentability received WO App. No. 2019040090.
Feb. 3, 2020 Exam Notice.
Jun. 27, 2018 Notice of Allowance.
May 29, 2018 Notice of Allowance.
Aug. 22, 2017 Notice of Allowance.
Mar. 17, 2017 Notice of Allowance.
Nov. 16, 2016 Second Office Action.
Nov. 15, 2016 EPO Notification R161(1) & R.162.
Oct. 25, 2016 Office action (3 months).
Oct. 20, 2016 Office action (3 months).
Sep. 27, 2016 First office action.
Aug. 22, 2016 First office action.
Aug. 2, 2016 Notice of Allowance.
Jul. 29, 20169 Office action (3 months).
Jun. 2016 Office action (3 months).
May 27, 2016 Notice of Allowance.
May 26, 2016 Notice of Allowance.
Apr. 8, 2016 Office action (2 months).
Mar. 7, 2016 Final Office Action.
Feb. 23, 2016 Office action (3 months).
Nov. 3, 2015 Final Office Action.
Oct. 22, 2015 Office action (3 months).
May 13, 2014—Office Action—K4262EDE1.
Jun. 13, 2019 Non-Final OA.
Jan. 10, 2019 Notice of Allowance.

* cited by examiner

MODULAR ROTARY CUTTING TOOL

FIELD OF THE INVENTION

The invention relates in general to a rotary cutting tool, and in particular to a modular rotary cutting tool, such as a drill, and the like, with a cutting head and a support for accommodating the cutting head.

BACKGROUND OF THE INVENTION

One type of rotary tool is a modular rotary tool with two coupling parts; namely, a support and a cutting head. The cutting head is interchangeably mounted in the pocket structure of the support. Unfortunately, in these designs, the radial and axial forces that occur during a drilling operation, especially on uneven or inclined surfaces, may lead to excessive elastic or ultimately plastic deformation of the pocket structure, which can result in peak loads and breakages.

SUMMARY OF THE INVENTION

Embodiments of the invention are directed to addressing problems associated with excessive stresses and deformation of the pocket structure by providing clamping surfaces that are inclined with respect to the central, longitudinal axis of the rotary cutting tool, thereby preventing unwanted movement of the cutting head in the support during a drilling operation. Another problem addressed by the invention is in the reduction of stresses on critical areas of the cutting head.

In one aspect of the invention, a cutting head for a rotary tool extending in an axial direction along an axis of rotation includes a front cutting part; a coupling pin having an outer peripheral surface, the coupling pin divided into a front pin part and a rear pin part, the front pin part having a circumferential groove, the coupling pin including a torque surface formed on the rear pin part, and a clamping surface formed on the front pin part; and a stop surface for an axial pullout prevention effective in the axial direction, wherein the clamping surface tapers radially inward in a direction of the front cutting part.

In another aspect of the invention, a rotary tool is provided extending in an axial direction along an axis of rotation having a support including a pair of opposing support structures, each support structure having an inner peripheral surface defining a coupling pin receptacle, the inner peripheral surface divided into a front receiving part and a rear receiving part, the rear receiving part including a circumferential groove, the front receiving part including a clamping surface and the rear receiving part including a stop surface. The rotary tool further including a cutting head capable of being received in the coupling pin receptacle of the support, the cutting head having a front cutting part; a coupling pin having an outer peripheral surface, the coupling pin divided into a front pin part and a rear pin part, the front pin part having a circumferential groove, the rear pin part including a torque surface, and the front pin part including a clamping surface; and a stop surface for an axial pullout prevention effective in the axial direction, wherein the clamping surfaces of the support and the cutting head taper radially inward in a direction of the front cutting part.

In yet another aspect of the invention, a rotary tool is provided extending in an axial direction along an axis of rotation, having a support including a pair of opposing support structures, each support structure having an inner peripheral surface defining a coupling pin receptacle, the inner peripheral surface divided into a front receiving part and a rear receiving part, the rear receiving part having a circumferential groove, the front receiving part including clamping surfaces and the rear receiving part including stop surfaces; and a cutting head capable of being received in the coupling pin receptacle of the support. The cutting head includes a front cutting part defining a cutting diameter, D; a coupling pin having an outer peripheral surface, the coupling pin divided into a front pin part and a rear pin part, the front pin part having a circumferential groove, the rear pin part including torque surfaces, and the front pin part including clamping surfaces; and stop surfaces for an axial pullout prevention effective in the axial direction, wherein the clamping surfaces of the support and the cutting head taper radially inward in a direction of the front cutting part at a non-zero, second angle of inclination, $\alpha 2$, of between 2.5 degrees to 6.0 degrees with respect to the axis of rotation, and wherein a gap exists between the stop surfaces of the support and the cutting head, and wherein a distance of the gap is greater than zero to about 1 percent of a diameter, D, defined by the support.

These and other aspects of the present invention will be more fully understood following a review of this specification and drawings.

BRIEF DESCRIPTION OF THE DRAWINGS

While various embodiments of the invention are illustrated, the embodiments shown should not be construed to limit the claims. It is anticipated that various changes and modifications may be made without departing from the scope of this invention.

DETAILED DESCRIPTION OF THE INVENTION

Figure 1A:
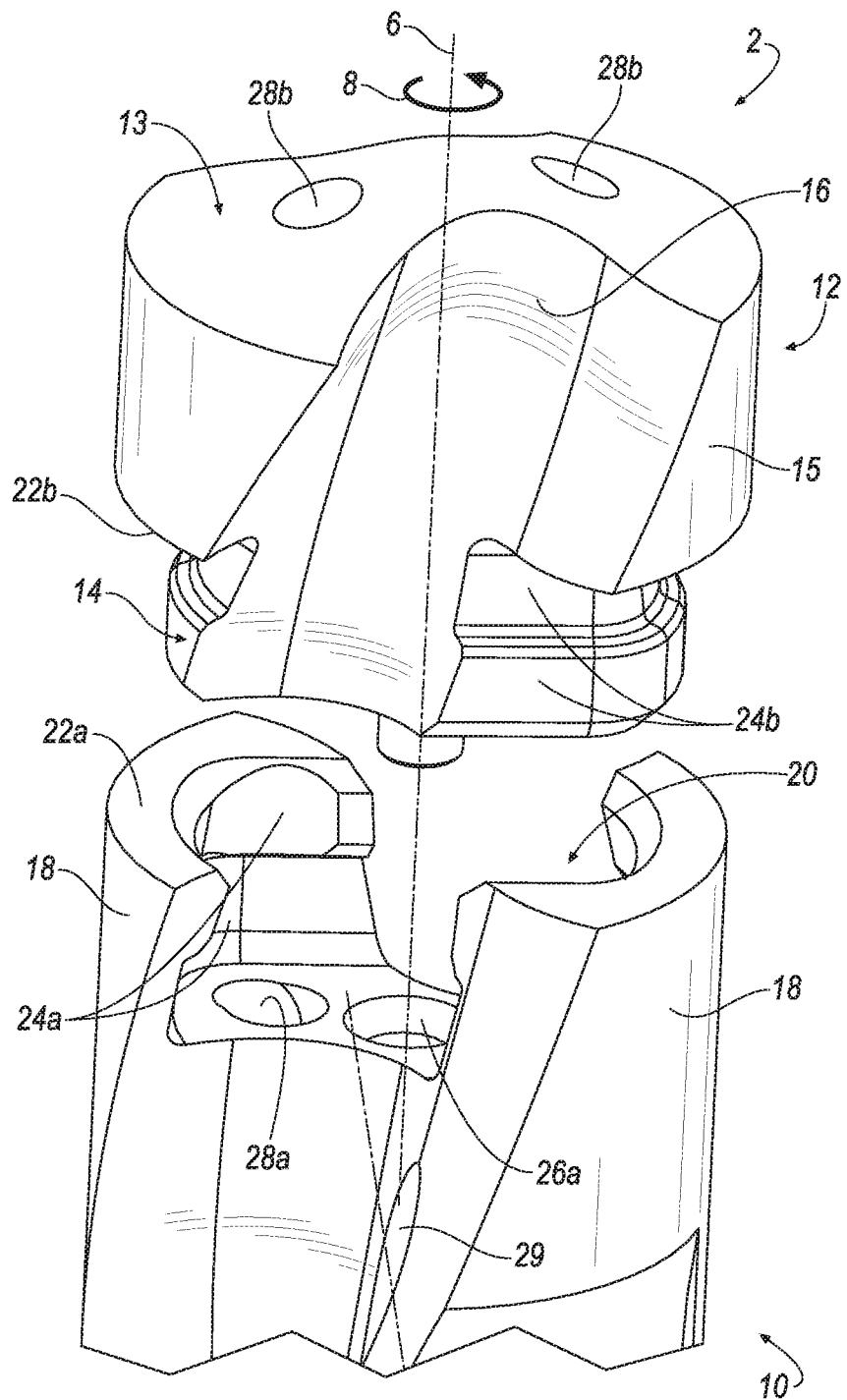
FIG. 1A is a perspective, exploded view of a section of a rotary tool with a support and a cutting head according to an embodiment of the invention.
Figure 1B:
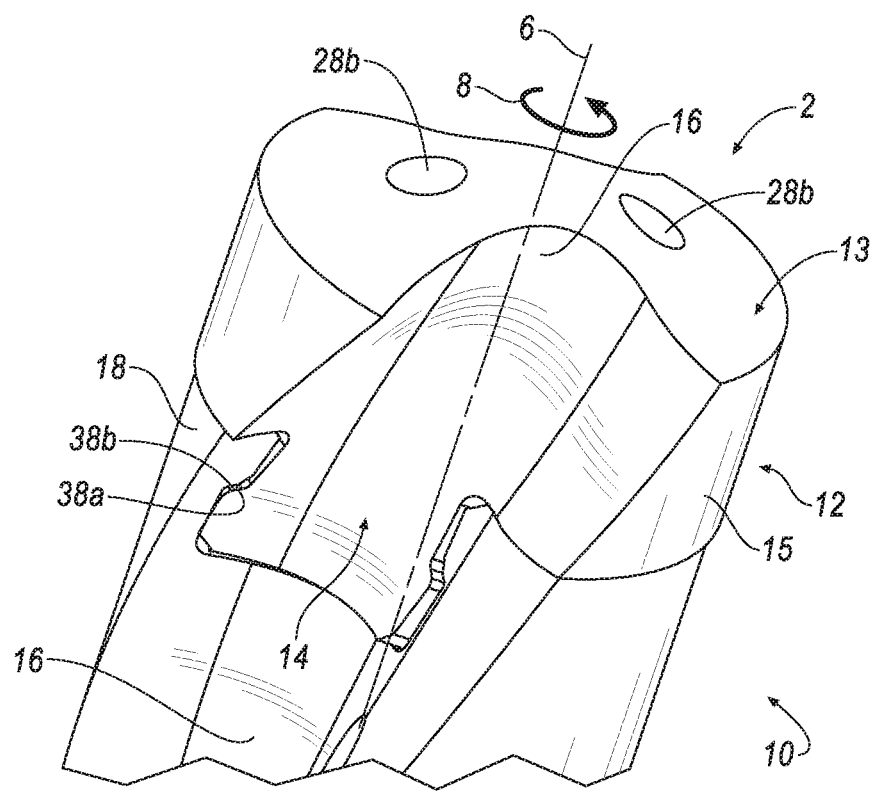
FIG. 1B is a perspective view of a section of the rotary tool according to FIG. 1A when the cutting head is inserted in the support.

Referring now to FIGS. 1A and 1B, a rotary tool 2 is shown according to an embodiment of the invention. The rotary tool 2 extends in an axial direction along an axis of rotation 6. The rotary tool 2 rotates around the axis of rotation 6 during normal operation in the direction of rotation, and peripheral direction 8.

In the illustrated embodiment, the rotary tool 2 comprises a modular rotary drill cutting tool including a support 10 and a cutting head 12 that can be interchangeably mounted to the support 10. However, the invention is not limited to use with a modular rotary drill cutting tool. The rotary tool can also be, for example, a milling tool or another type of rotating tool, for example a reamer, a tap, or the like.

Referring to FIGS. 1A-2D, the cutting head 12 has a front cutting part 13 and a coupling pin 14 extending axially away from the front cutting part 13 (thus, in an axially rearward direction). The front cutting part 13 of the cutting head 12 defines a cutting diameter, DC (see FIG. 2D). On its circumference, the cutting head 12 has an outer peripheral surface 15 that is interrupted by opposite-facing flutes 16 that start in the cutting head 12 and continuously merge into functionally compatible flutes disposed in the support 10. In the exemplary embodiment, the flutes 16 are substantially helical in shape. However, in an alternate embodiment it will be appreciated that the flutes 16 can be straight.

As used herein, elements on the support 10 are identified below with the letter "a" and on the cutting head 12 with the letter "b."

Figure 3A:
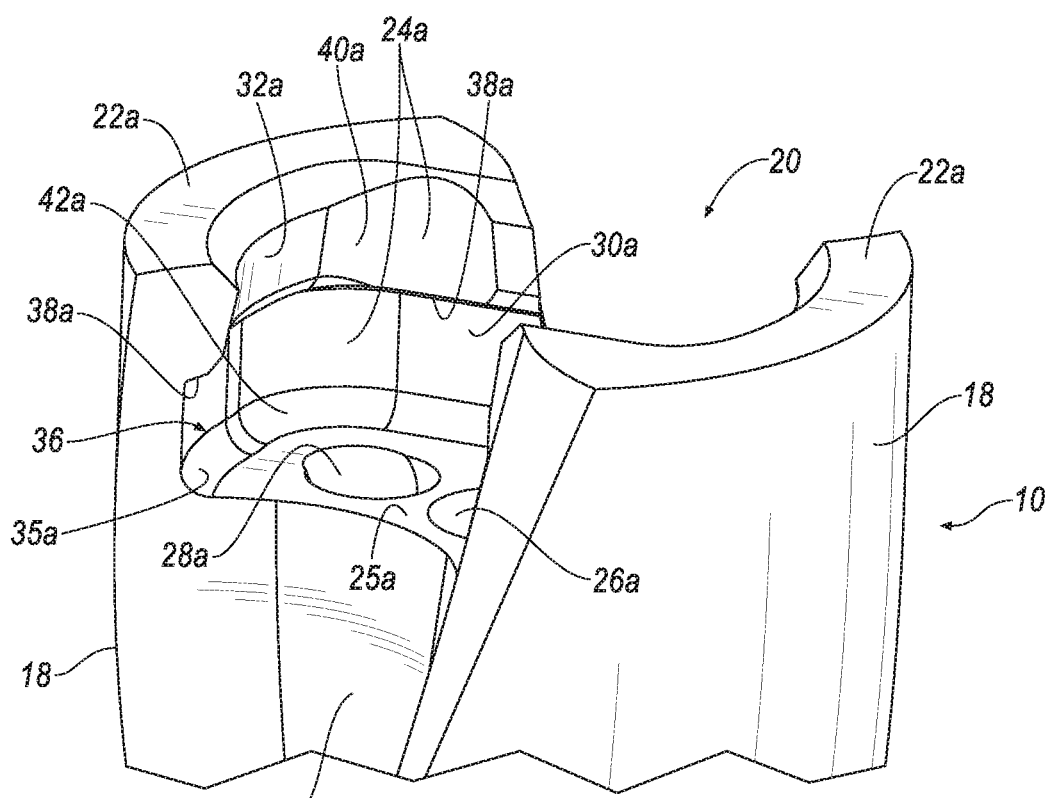
FIG. 3A is a perspective view of a support for accommodating the cutting head according to FIGS. 2A through 2D for the rotary tool described in FIGS. 1A and 1B according to an embodiment of the invention.
Figure 3B:
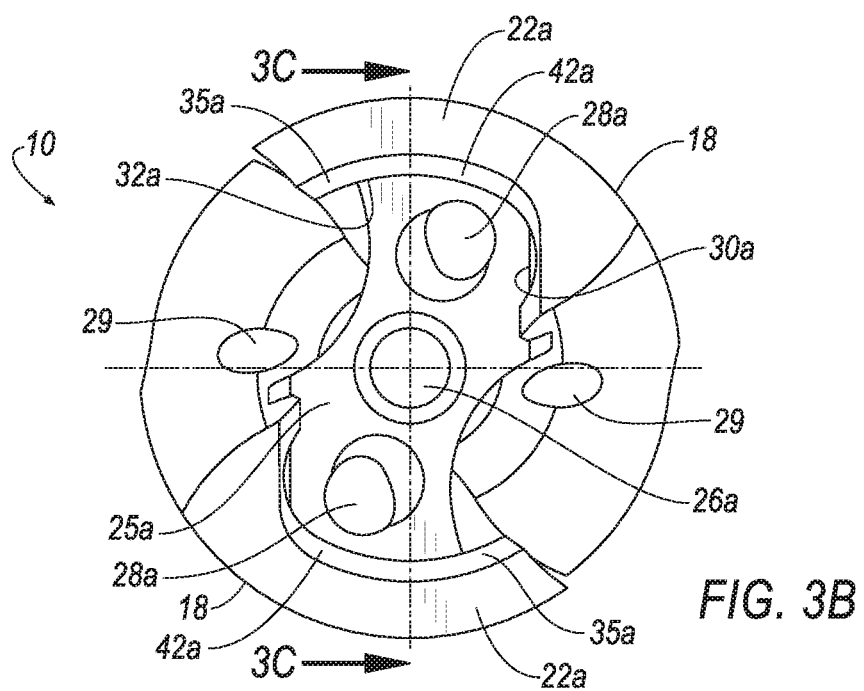
FIG. 3B is a top view of the support according to FIG. 3A.
Figure 3C:
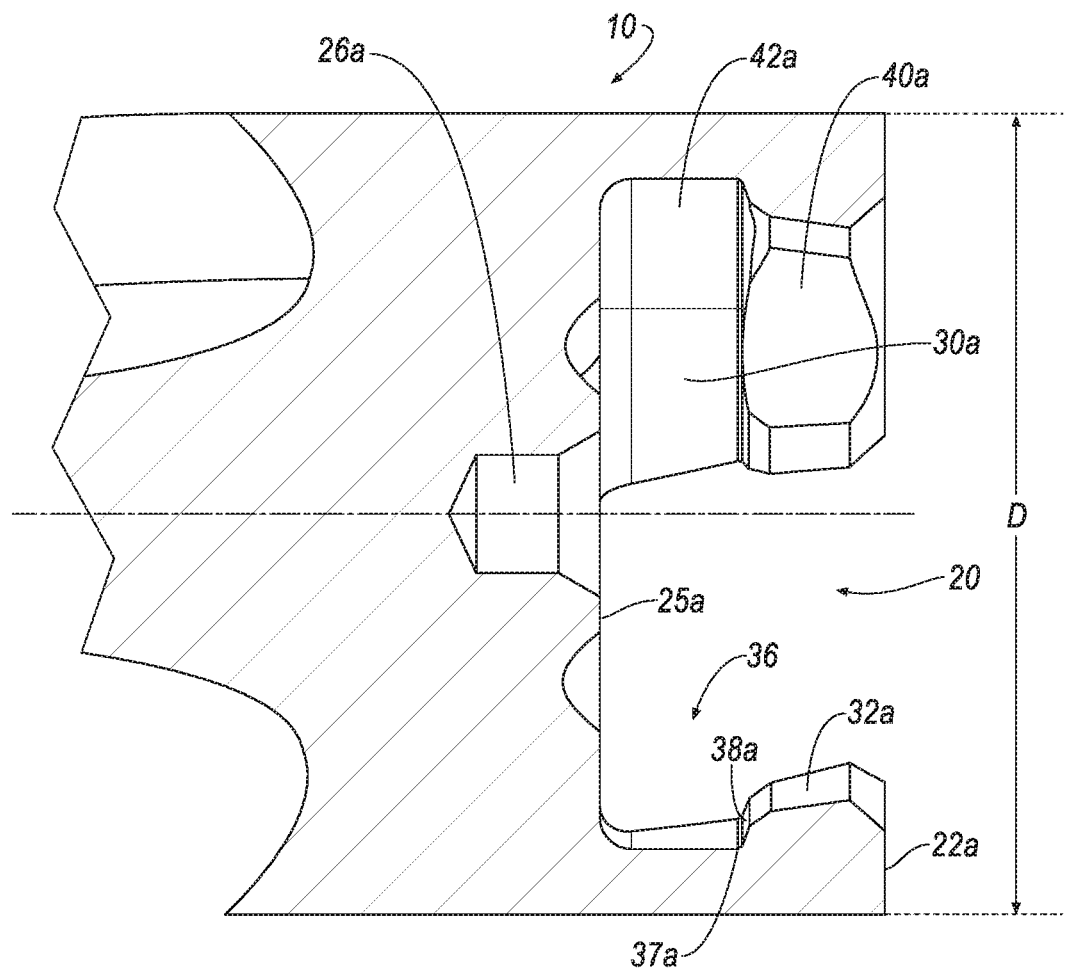
FIG. 3C is a sectional view along lines of intersection C-C in FIG. 3B.

Referring to FIGS. 3A-3C, the front side of the support 10 has two opposite-facing support structures 18 that are interrupted by the flutes 16. As shown in FIG. 3B, the support structures 18 extend in a circumferential direction across an angular range of approximately 45 degrees to about 60 degrees. Each support structure 18 includes a front contact surface 22a; these surfaces 22a are arranged on a common horizontal plane that is substantially perpendicular to the axis of rotation 6. The front contact surfaces 22a may be either flat or conical that is formed at an angle with respect to the common horizontal plane.

As seen in FIG. 3A, the inner peripheral surfaces 24a of the support structures 18 define a coupling pin receptacle 20 for receiving the coupling pin 14 of the cutting head 12. The coupling pin receptacle 20 includes a base 25a extending horizontally, i.e. perpendicular to the axis of rotation 6. A centering hole 26a is disposed within the base 25a and is substantially concentric to the axis of rotation 6. In addition, in a preferred embodiment, the rotary tool 2 may include one or more coolant channels 28a disposed within the support 10, which exit through the base 25a and are in fluid communication with corresponding coolant channels 28b disposed within the cutting head 12. The rotary tool 2 may also include auxiliary coolant channels 29 (FIG. 3B) extending from one or both coolant channels 28a, 28b that exit through the flutes 16.

The coupling pin receptacle 20 is divided into two parts, namely a front receiving part 40a and a rear receiving part 42a. As shown in FIG. 3A, the inner peripheral surfaces 24a of the support 10 includes torque surfaces 30a and clamping surfaces 32a. As shown in FIG. 3C, the torque surfaces 30 do not lie in the same plane that is substantially perpendicular to the central, axis of rotation 6. As shown in FIG. 3A, the rear receiving part 42a comprises a circumferential groove 36 formed therein. Stop surfaces 38a are formed between the front receiving part 40a and the rear receiving part 42a.

Referring again to FIGS. 2A-2D, the coupling pin 14 of the cutting head 12 extends in the axial rearward direction with respect to the front cutting part 13. The coupling pin 14 is offset in a radially inward direction from the outer peripheral surface 15. Corresponding to the inner peripheral surfaces 24a of the coupling pin receptacle 20 of the support 10, the coupling pin 14 has outer peripheral surfaces 24b, on which are formed torque surfaces 30b and clamping surfaces 32b. Like the surfaces 30a, 32a of the support, the torque and clamping surfaces 30b, 32b of the cutting head 12 are offset with respect to one another in the peripheral direction 8.

The cutting head 12 also includes two horizontal head bearing surfaces 22b formed at the transition between the front cutting part 13 and the coupling pin 14. In one embodiment, the head bearing surfaces 22b are arranged in a common generally horizontal plane and are separated by the flutes 16.

Similar to the coupling pin receptacle 20 of the support 10, the coupling pin 14 of the cutting head 12 is divided into two parts, namely a front pin part 40b and a rear pin part 42b. In the illustrated embodiment, the front pin part 40b comprises a partially circumferential groove 37, which is interrupted by the flutes 16. A radius blend 23b is formed as a transition between the circumferential groove 37 and the head-bearing surfaces 22b. In other words, the radius blend 23b extends between the front pin part 40b and the head-bearing surfaces 22b.

Also, an insertion pin 26b (e.g., generally cylindrical in shape) extends from the coupling pin 14 and is formed concentrically with respect to the axis of rotation 6. The insertion pin 26b is optional and is formed solely for use as a first centering aid for the cutting head 12 when mounted in the support 10 (e.g., into a centering hole 26a as shown in FIG. 1A). It is noted that the cutting head 12 is also centered by the clamping surfaces 32a and 32b when mounted in the support 10.

Figure 2A:
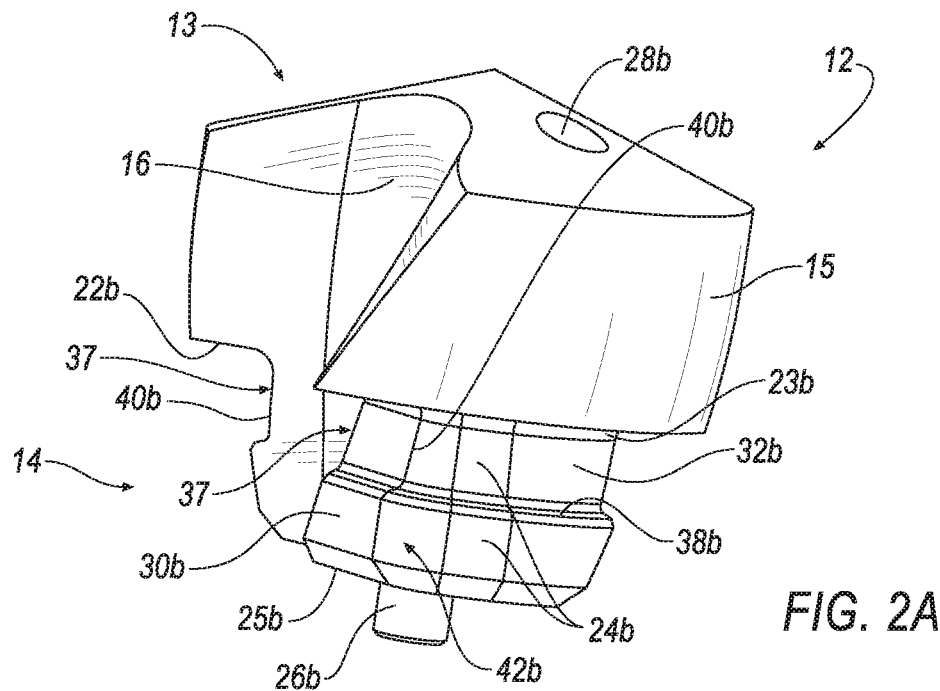
FIG. 2A is a perspective view of the cutting head according to an embodiment of the invention.
Figure 2B:
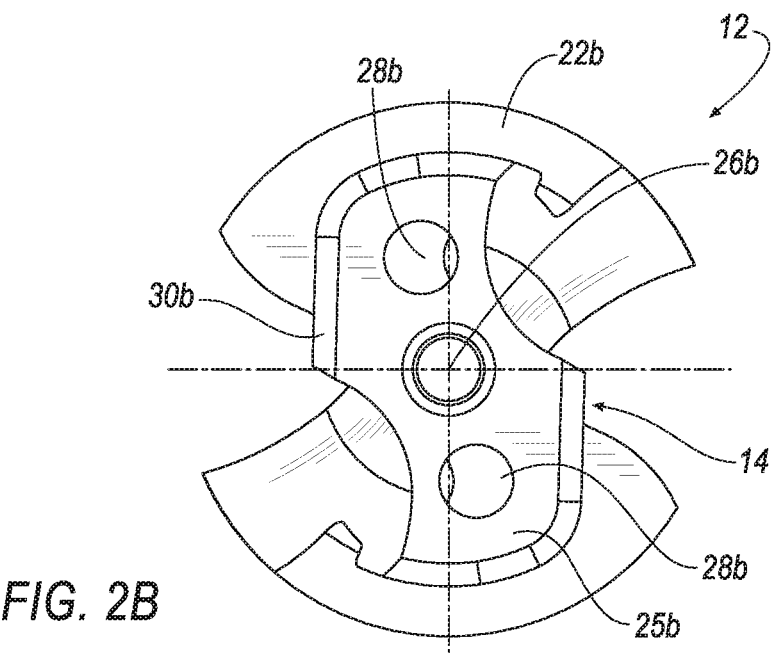
FIG. 2B is a bottom-side view of the cutting head according to FIG. 2A.
Figure 2C:
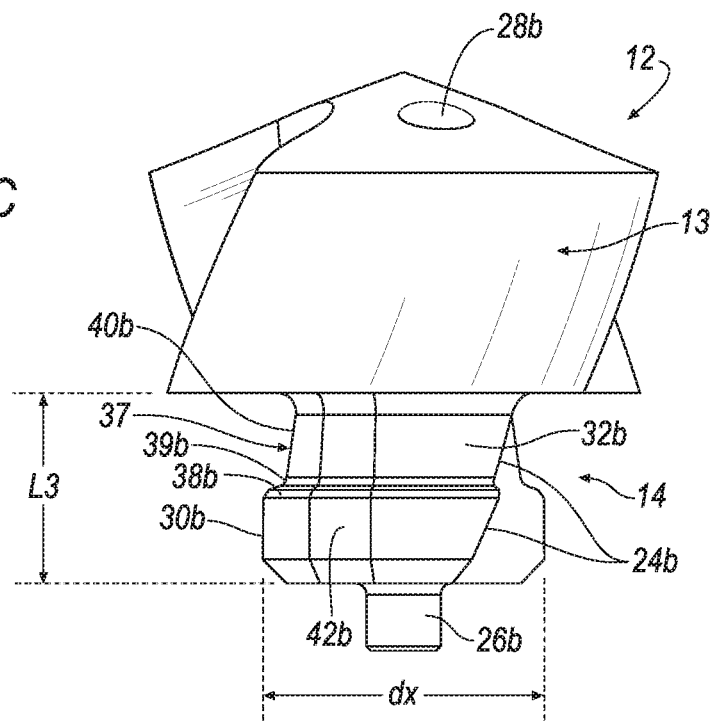
FIGS. 2C, 2D are side views of the cutting head according to FIG. 2A rotated toward one another at 90°.

Referring now to FIGS. 2B and 2C of the cutting head 12 and FIG. 3B of the support 10, the coupling pin 14 of the cutting head 12 and the coupling pin receptacle 20 of the support 10 have a generally rectangular-like shape. As such, the torque surfaces 30a, 30b are formed on the long sides of the rectangle, and the clamping surfaces 32a, 32b are formed on the short sides of the rectangle approximately 90 degrees offset from the torque surfaces 30a, 30b.

In the exemplary embodiment, the aforementioned "two parts" in each of the head 12 and support 10 (i.e., the front pin part 40b and rear pin part 42b and the front receiving part 40a and rear receiving part 42a) form two function zones or functional surfaces. In the illustrated embodiment, the front pin part 40b is radially inward with the rear pin part 42b. In addition, the front pin part 40b is axially offset with respect to the rear pin part 42b. The clamping surfaces 32a and 32b are formed in the front parts 40a, 40b, and the torque surface 30a, 30b are formed in the rear parts 42a, 42b. In other words, the clamping surfaces 32a of the support 10 are formed in the front receiving part 40a and the torque surfaces 30a of the support 10 are formed in the rear receiving part 42a. Likewise, the torque surfaces 30b of the cutting head 12 are formed in the rear pin part 42b and the clamping surfaces 32b of the cutting head 12 are formed in the tapered front pin part 40b.

Figure 2D:
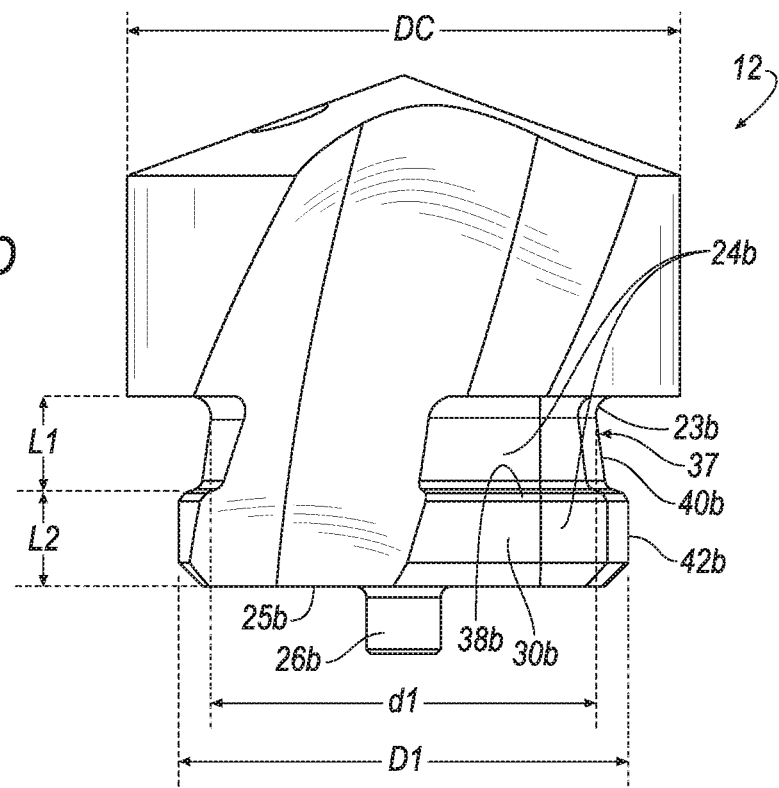

Referring to FIGS. 2C and 2D, a small radius blend 39b is disposed as a transition between the stop surfaces 38b and the circumferential groove 37. The coupling pin 14 defines a diameter, D1, of the rear pin part 42b, and a minimum diameter, d1, of the tapered front pin part 40b. The support 10 has an external diameter, D, as shown in FIG. 3C. In one embodiment, the ratio of the minimum diameter, d1, to the external diameter, D, of the support 10, is in a range between about 0.60 and about 0.80. In other words, $0.60 \leq d1/D \leq 0.80$. Also, the ratio of the minimum diameter, d1 to the diameter, D1, of the rear pin part 42b is between about 0.60 and about 0.95, or in other words $0.60 \leq d1/D1 \leq 0.95$. In addition, the ratio of the diameter, D1 to the external diameter, D of the support 10, is in the range between about 0.65 and about 0.95. In other words, $0.65 \leq D1/D \leq 0.95$.

It has been found that the ratio d1/D of less than 0.60 results in a weaker coupling pin 14 and less available space for coolant holes, while a ratio of greater than 0.80 results in the possibility of a weaker support 10, in that more cross-sectional space needs to be assumed by the coupling pin 14. Analogous considerations have been found to hold for the ratio of d1/D1. Thus, a ratio of less than 0.60 results in a weaker coupling pin 14 and a ratio of greater than 0.95 results in a weaker support 10.

In addition, it has been found that the ratio d1/D1, of less than 0.60 results in a weaker coupling pin 14, thereby greatly compromising the strength of the cutting head 12, while a ratio of greater than 0.95 results in an inadequate surface area for axial support, while compromising on the space available for the radius blends 23b and 39b.

The front pin part 40b of the cutting head 12 has a front pin part length, L1, in the direction along the axis of rotation 6 that is defined by the distance between the head-bearing surfaces 22b and the stop surface 38b. In the same manner, the front receiving part 40a of the support 10 has an axial length that is approximately equal to the axial length, L1, of the front pin part 40a.

The rear pin part 42b of the cutting head 12 has a rear pin part length, L2, extending in the direction along the axis of rotation 6 that is defined by the distance between the stop surfaces 38b and the base surface 25b. In the same manner, the rear receiving part 42a of the support 10 has an axial length that is approximately equal to the axial length, L2, of the rear pin part 42b.

Figure 4A:
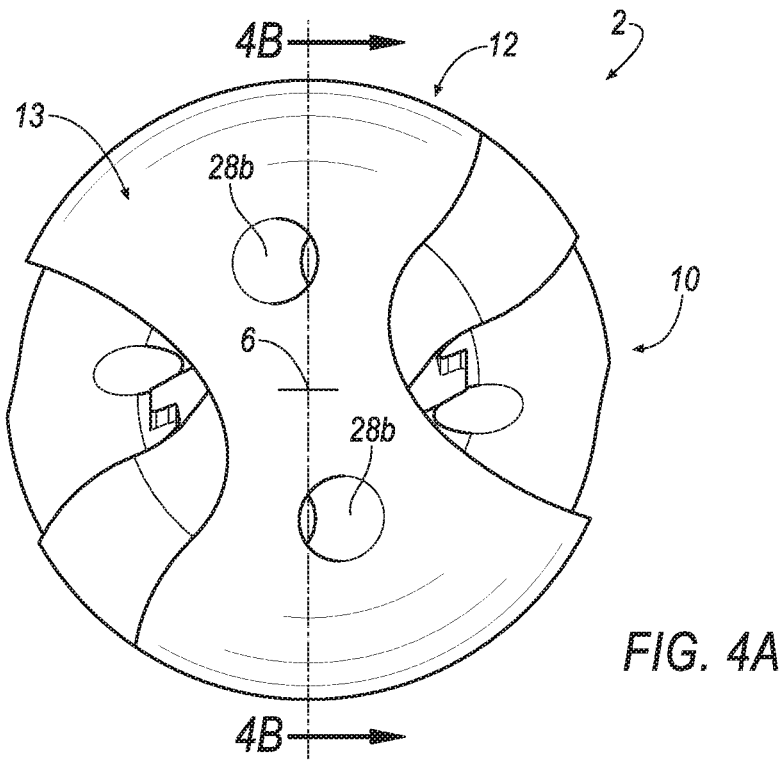
FIG. 4A is an enlarged view top of the rotary tool according to an embodiment of the invention.
Figure 4B:
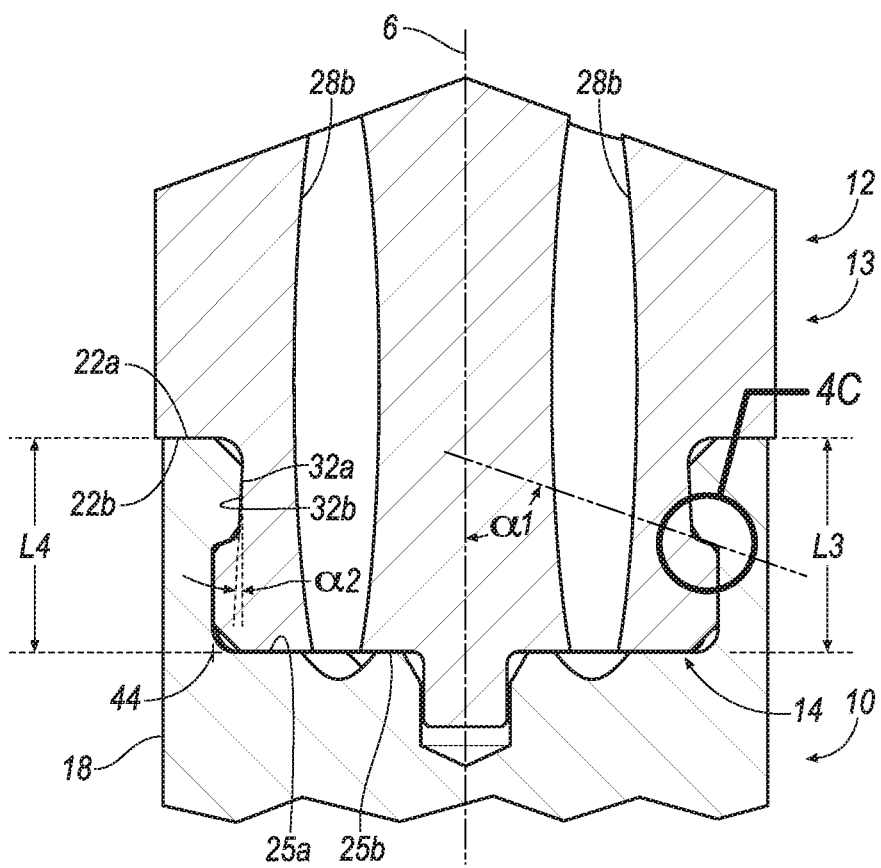
FIG. 4B is a sectional view along lines of intersection 4B-4B in FIG. 4A.

In one embodiment, the front pin part length, L1, and the rear pin part length, L2, are approximately equal. In another embodiment, the front pin part length, L1, and the rear pin part length, L2, preferably differ by no more than about 30 percent to 50 percent. In other words, the front pin part length, L1, differs by no more than about 0.30 to about 0.50 times the rear pin part length, L2. As shown in FIGS. 2C and 4B, the front pin part length, L1, and the rear pin part length, L2, combine to define a total pin length, L3. As shown on FIG. 3C, the ratio of the total pin length, L3, to the external diameter, D, of the support 10 is in a range between about $0.30 \leq L3/D \leq 0.45$. The ratio of the total pin length, L3 to the diameter, D1, can also be in the range $0.35 \leq L3/D1 \leq 0.70$. In addition, the ratio of the distance, dx, between the torque surfaces 30b to the diameter, D, of the support 10 ranges between about $0.40 \leq dx/D \leq 0.65$. Similarly, the ratio of the distance, dx, between the torque surfaces 30b to the diameter, D1, can be expressed as $0.45 \leq dx/D1 \leq 0.80$. For example, for a rotary tool with a support with diameter, D, of about 16 mm, the distance between the torque surfaces 30b of the coupling pin 14 can range between about 6.4 mm to about 10.4 mm, and the total pin length, L3, can range between about 4.8 mm to about 7.2 mm.

It has been found that the ratio, dx/D, having a value of less than 0.40 results in a weaker coupling pin 14, while a ratio of greater than 0.65 results in weaker support, in that the length of torque surfaces 30a, 30b, as measured in a radial direction, become smaller and the amount of material behind the torque surfaces 30a of the support 10 is significantly reduced. Analogous considerations have been found to hold for the ratio of dx/D1. Thus, the ratio of dx/D1 having a value of less than 0.45 results in a weaker coupling pin 14, while a value of greater than 0.80 results in inadequately small torque surfaces 30a, 30b and a weaker support 10.

Further, it has been found that the ratio, L3/D, having a value of less than 0.30 results too small of a surface area for torque transmission, leading to excessive contact pressure. It can also result in a reduction of the clamping surface area, which compromises clamping action and centering action. For a ratio of greater than 0.45, the significant disadvantage becomes an excess in flexibility (of the support 10), thus holding the cutting head 12 in place much less effectively. Analogous considerations have been found to hold for the ratio, L3/D1. Thus, the ratio, L3/D1, having a value of less than 0.35 results in less area for torque transmission and clamping, while a ratio of greater than 0.70 results in too much flexibility for the support 10.

In addition, the coupling pin receptacle 20 has a coupling pin receptacle length, L4. In the illustrated embodiment, the total pin length, L3, and the coupling pin receptacle length, L4 are substantially equal such that the head bearing surfaces 22b contact the front contact surfaces 22a, and the pin base surface 25b contacts the base 25a of the support 10. In an alternate embodiment, the total pin length, L3, is shorter than the coupling pin receptacle length, L4 such that the pin base surface 25b does not contact the base surface 25a of the support 10.

Figure 4C:
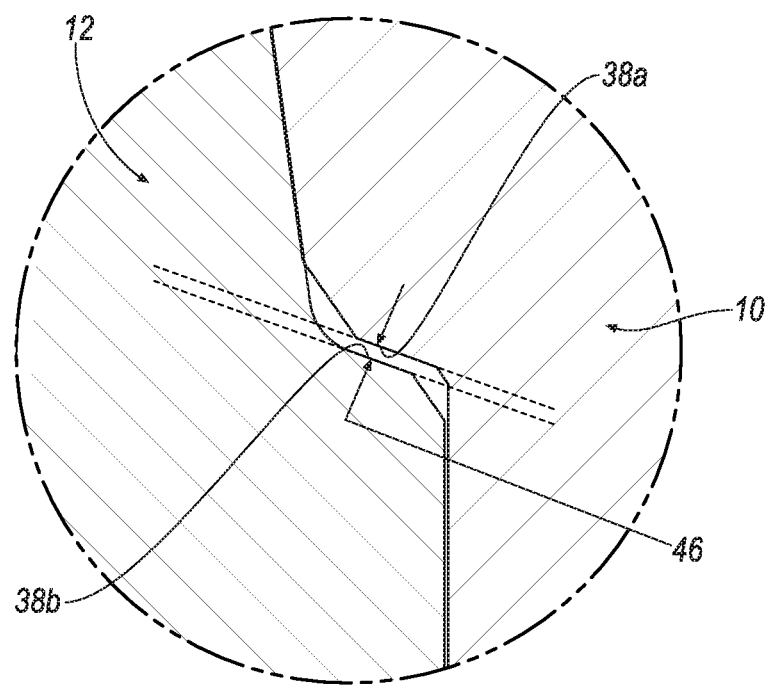
FIG. 4C is an enlarged view, taken from FIG. 4B, of the gap between the stop surfaces of the support and cutting head.

Referring now to FIGS. 4B and 4C, the stop surfaces 38a, 38b are formed at a first angle of inclination, $\alpha 1$, with respect to the axis of rotation 6. The first angle of inclination, $\alpha 1$, preferably ranges between about 45 degrees and about 85 degrees, and most preferably between about 60 degrees and about 75 degrees. In the exemplary embodiment, the first angle of inclination, $\alpha 1$, is approximately about 70 degrees. Alternatively, the stop surfaces 38a, 38b may extend in a horizontal direction substantially perpendicular to the axis of rotation 6 (i.e., about 90° with respect to the axis of rotation 6.

Referring to FIG. 4C, the stop surfaces 38a and 38b extend a few millimeters in length in a direction transverse to the axis of rotation 6, depending on the diameter, D, of the support 10. In one example, the stop surfaces 38, 38b extend about 0.5 mm to about 1.5 mm for a rotary drill cutting tool with a diameter, D, of the support 10 of about 16 mm.

In one embodiment, the transition areas between various lateral surfaces 30a and 30b, 32a and 32b in the axis of rotation 6 to the adjacent surfaces 22a and 22b, 38a and 38b, and 25a and 25b, are rounded or tapered.

Referring to FIG. 4B, in one aspect of the invention, the coupling pin 14 and the coupling pin receptacle 20 comprises a self-locking feature that creates clamping forces that are sufficient to securely hold the cutting head 12 within the support during a machining operation. Specifically, the self-locking feature comprises the clamping surface 32a of the support 10 and the clamping surface 32b of the cutting head 12, respectively, having a dove-tail design that tapers radially inward in the direction of the front cutting part 13.

In the illustrated embodiment, the clamping surfaces 32a, 32b are formed at a non-zero, second angle of inclination, α2, with respect to the axis of rotation 6. In other words, the clamping surfaces 32a, 32b form a truncated cone or conical section in which the generatrix intersects the axis of rotation 6 at the second angle of inclination, α2. The second angle of inclination, α2, preferably ranges between about 2.0 degrees and about 6.0 degrees. In one embodiment, the second angle of inclination, α2, ranges between about 2.5 degrees and about 5.0 degrees. In the exemplary embodiment, the second angle of inclination, α2, is about 2.85 degrees. The purpose of the second angle of inclination, α2, is to reduce the stresses occurring in the rotary cutting tool 2 during a machining operation is further discussed in FIGS. 5-7 below.

To assemble the cutting head 12 to the support 10, the cutting head 12 and the coupling pin 14 are inserted into the coupling pin receptacle 20 in the axial direction (i.e. along the axis of rotation 6). In this position, the cutting head 12 is rotated by approximately 90 degree with respect to the position shown in FIGS. 1A and 1B. When first inserted into the support 10, the insertion pin 26b of the cutting head 12 provides a centering feature for locating the cutting head 12 relative to the support 10. Once the base surfaces 25a, 25b come into mutual contact with each other, then the entire cutting head 12 is rotated about the axis of rotation 6 within the coupling pin receptacle 20 in a direction opposite to the peripheral direction 8.

In this intermediate position between initial contact of the base surfaces 25a, 25b and the end position, the stop surfaces 38a and 38b form a positive rear grip to prevent axial pullout of the cutting head 12. The clamping surfaces 32a and 32b form a press fit and cause the cutting head 12 to pivot about a pivot point 44 (FIG. 4B) to clamp the cutting head 12 to the support 10. In this intermediate position, a radial clamping force is applied to the clamping surfaces 32a, 32b from the support structures 18 onto the coupling pin 14. In the end position when the cutting head 12 cannot be further rotated with respect to the support 10, the corresponding torque surfaces 30a and 30b contact each together. In operation, forces applied by the support 10 are transmitted via the torque surfaces 30a, 30b into the cutting head 12 and via the front contact surfaces 22a and head bearing surfaces 22b.

In one embodiment, a gap 46 exists between the stop surfaces 38a and 38b to distribute the forces between the head 12 and the support 10, as shown in FIG. 4C. In addition, the gap 46 allows for easy assembly of the cutting head 12 to the support 10. The gap 46 can have a range greater than zero to about 1 percent of the support diameter, D. In other words, 0<gap≤0.01 D. For a rotary drill cutting tool having a support diameter, D, of about 16 mm, for example, the gap 46 can range greater than 0.0 mm to about 0.16 mm. With the tapered clamping surfaces 32a and 32b having a total 1:10 slope (i.e., 2.85 degrees or 1:20 per side), if the cutting head 12 is forced out of the pocket, a maximum additional interference between the cutting head 12 and the coupling pin receptacle 20 of the support 10 measured on diameter will be about 10 percent of the gap 46 until the stop surfaces 38a, 38b come into contact, thus preventing or minimizing excessive stresses in the location of the coupling pin receptacle 20.

Figure 5:
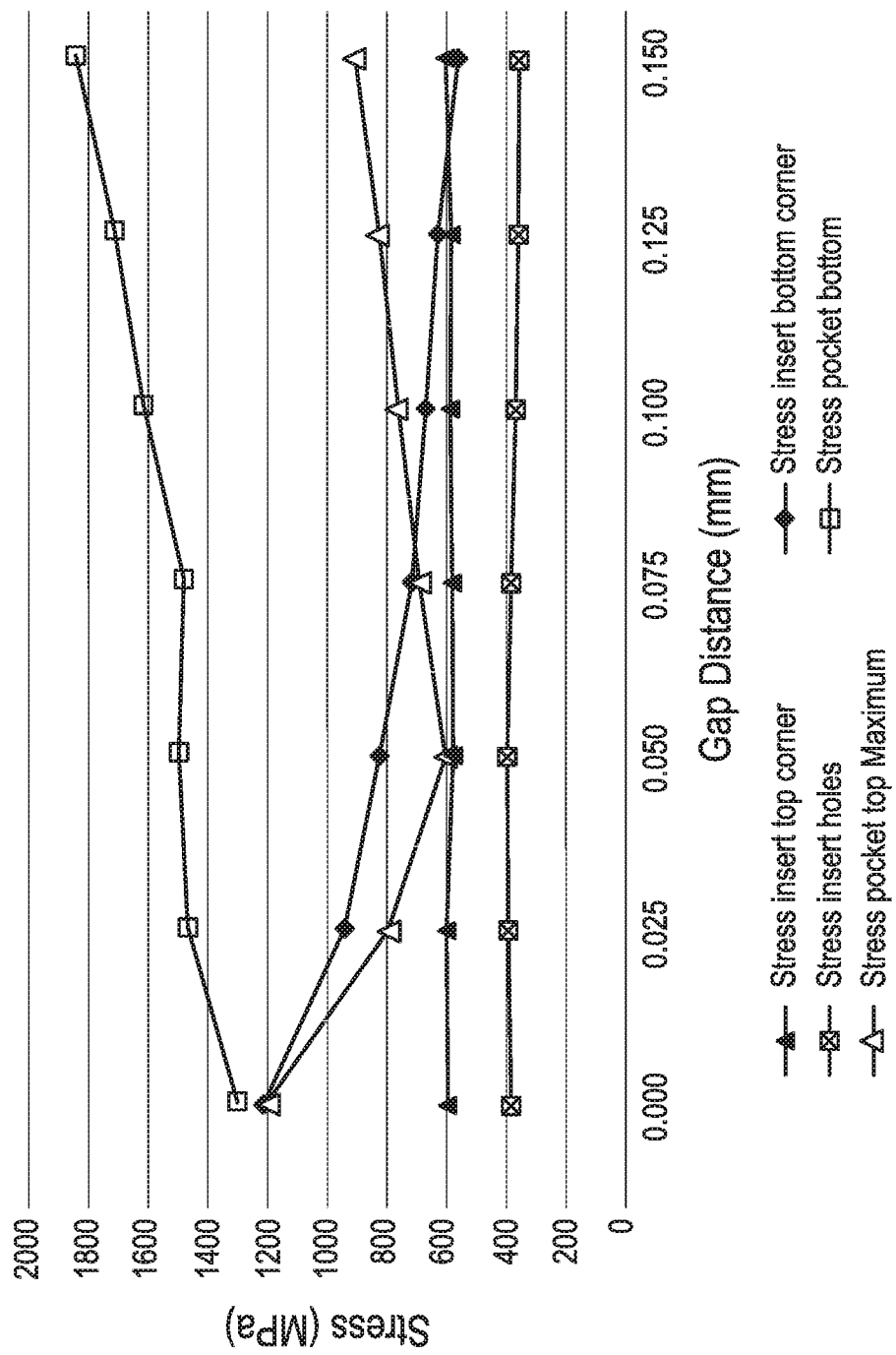
FIG. 5 is a graph showing results of a simulation of gap distance versus stress at various locations on the cutting head and the coupling pin receptacle of the support for an embodiment of the invention.

FIG. 5 shows the results of a simulation of distance of the gap 46 as a function of stress at various locations of the coupling pin 14 and the coupling pin receptacle 20. In FIG. 5, the stress located at a radius blend 35a that runs in the groove 36 of the rear receiving part 42a of the support 10, as shown in FIG. 3A, is represented by the boxes. The stress located at the small radius blend 39b disposed between the groove 37 and the stop surfaces 38b of the cutting head 12, as shown in FIG. 2C, is represented by the diamonds. The stress located at the radius blend 23b disposed between the groove 37 and the head-bearing surfaces 22b of the cutting head 12, as shown in FIG. 2A, is represented by the shaded triangles. The stress located at the coolant channels 28b of the cutting head 12, as shown in FIG. 1A, is represented by the X's. The stress located at a radius blend 37a (can also be a chamfer as in FIG. 3C) disposed between the groove 36 and the stop surfaces 38a of the support 10, as shown in FIG. 3C, are represented by empty triangles. All values are plotted as function of the distance of the gap 46 in mm.

The results of the simulation provide the unexpected result of reducing stress to a minimum at the radius blend 37a (FIG. 3C) adjacent the stop surfaces 38a when the distance of the gap 46 is about 0.05 mm. As the distance of the gap 46 becomes smaller, the stress located at the small radius blend 39b between the groove 37 and the stop surfaces 38b of the cutting head 12 and the stress located at the radius blend 37a of the support 10 increase, which indicates excessive contact forces in the stop surfaces 38b. As the distance of the gap 46 becomes larger, the stress at the radius blend 37a and the stress at the radius blend 35a increases, which indicates that the cutting head 12 is moving in the coupling pin receptacle 20 excessively and indicates that the axial pullout prevention is being defeated.

As mentioned above, an extremely reliable coupling is realized between the cutting part 12 and the support 10 by the design described herein containing the function surfaces separated into different axial function zones, namely torque surfaces 30a and 30b and clamping surfaces 32a and 32b, as well as the axial pullout prevention surfaces in the form of the stop surfaces 38a and 38b, in combination with the clamping surfaces 32a, 32b tapering radially inward toward the front cutting part 13.

In addition, the dove-tail design of the clamping surfaces 32a, 32b has the effect of increasing clamping forces with increasing axial force during a drilling operation. Due to the interference fit between the clamping surfaces 32a and 32b, the pocket support walls 18 will deform outwardly when the head is mounted, causing the surfaces 22a to deviate from their original position and creating a small gap between the surfaces 22a and 22b near the outer diameter of the support 10. During a machining operation, the resultant axial force is then transmitted between surfaces 22a and 22b in the region proximate to the inner diameter of the support 10, creating a bending moment about point 44 which will cause the support walls 18 to apply additional clamping force into the cutting head 12. As a result, deformation and stresses on the coupling pin receptacle 20 are minimized during a drilling operation, thereby enhancing the connection between the support 10 and the cutting head 12.

The tapered clamping surfaces 32a, 32b, in combination with the groove 36 and the axial supports 38a, 38b, provide an advantage to the design. A relatively small taper angle on the clamping surfaces 32a, 32b provide stability to the cutting head 12 when drilling in conditions that will generate side loads, and prevent overload to the critical areas of the head and receptacle which are prone to high stress and breakage. More specifically, transition areas defined by the radius blends 23b and 39b of the head and 35a of the receptacle are subjected to high stress caused by combination of torsional and bending loads. It is desirable that these radius blends 23b and 39b are made as large as possible, but due to the small space available between the clamping surfaces 32a and 32b and the need of forming the axial support surface 38b, the radius blend 39b becomes small and more critical. The radius blend 23b can be substantially larger than the radius blend 39b. The tapered clamping surfaces 32a, 32b will bear significant part of the load preventing overstressing smaller radius blend 39b. Under higher side loads, the axial support surfaces 38a and 38b will guarantee that the cutting head 12 stays in its position, thereby providing stability and reliability to the connection.

According to designs as broadly contemplated herein, the stresses on critical areas of the support 10 will be minimized and kept to acceptable levels even under side loads, unlike conventional dovetail designs where the taper provides both clamping and retention. On conventional dovetail designs, the stress in the pocket will grow significantly under side loads as the cutting head displaces and pushes the walls 18 outwardly. Another advantage found here is that the combination of the dovetail-shaped clamping surfaces 32a, 32b and the groove 36 form a more flexible support structure 18. This allows the use of the same taper angles on the clamping surfaces 32a of coupling pin receptacle 20 and the clamping surfaces 32b of the cutting head 12 as the elastic deformation of support structure 18 will guarantee full surface contact during the machining operation.

Figure 6:
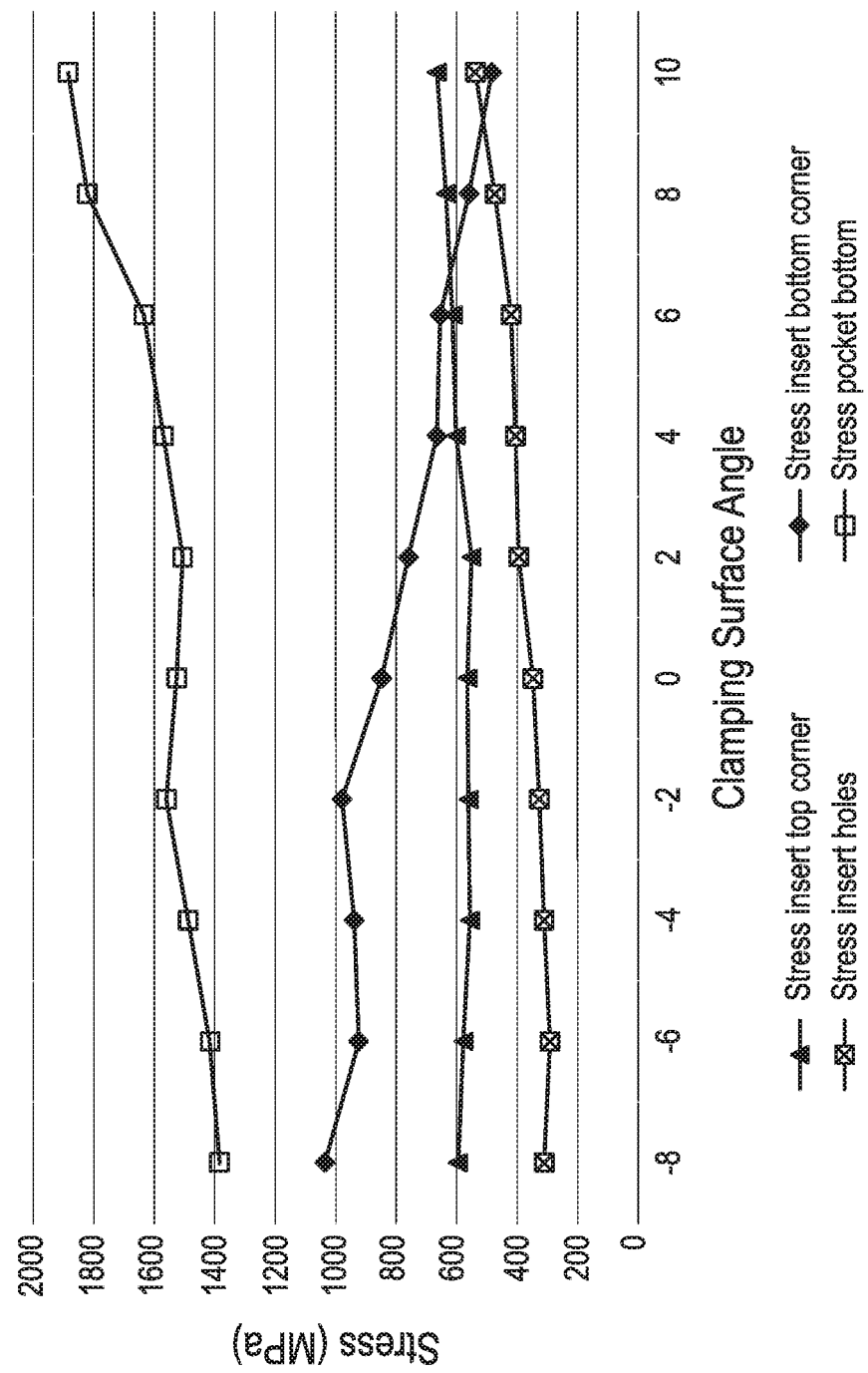
FIG. 6 is a graph showing results of a simulation of clamping surface angle versus stress at various locations on the cutting head and the coupling pin receptacle of the support for an embodiment of the invention.

FIG. 6 shows the results of simulation tests that were conducted on the dove-tail design of the clamping surfaces 32a, 32b of the invention. In FIG. 6, the stress located at a radius blend 35a that runs in the groove 36 of the rear receiving part 42a, as shown in FIG. 3A, is represented by the boxes. The stress located at the small radius blend 39b disposed between the groove 37 and stop surfaces 38b, as shown in FIG. 2C, is represented by the diamonds. The stress located at the radius blend 23b disposed between the groove 37 and the head-bearing surfaces 22b, as shown in FIG. 2A, is represented by the triangles. The stress located at internal surface of the coolant channels 28b of the cutting head 12, as shown in FIG. 1A, is represented by the X's. All values are plotted as function of the second angle of inclination, α2 in degrees.

As shown in FIG. 6, the stress located at the radius blend 23b disposed between the groove 37 and the head-bearing surfaces 22b, represented by the triangles, remains generally constant as a function of α2. In addition, the stress located at the coolant channels 28b of the cutting head 12, represented by the X's, increase as a function of the second angle of inclination, α2.

The results of the simulation tests (related to FIG. 6) show the unexpected result that maximum stress located at the radius blend 35a of the coupling pin receptacle 20 remains generally constant when the second angle of inclination, α2, of the clamping surfaces 32a, 32b increases from 0.0 degree to about +5.0 degrees. As expected, the stress located at the small radius blend 39b of the coupling pin 12 continuously decreases as the second angle of inclination, α2, of the clamping surfaces 32a, 32b increases from 0.0 degree due to the dovetail action preventing lateral movement of the head. It is desirable to maximize the second angle of inclination, α2, to prevent unwanted movement of the cutting head 12 during the drilling operation, however, with increased second angle of inclination, α2, and consequent reduction of cross-sectional diameter, d1, of the tapered front pin part 42b, the stresses on the coolant channels 28a, 28b can surpass the critical limits. The coolant channels 28a, 28b have a general rough surface because the coolant channels 28a, 28b are not produced, for example, from a grinding operation therefore lower stress limits must be observed. Additionally, for angles greater than about 6 degrees, the stress on blend radius 23b becomes greater than the stress on the blend 39b. As broadly contemplated herein, a second angle of inclination, α2, may be in a range between about 2.5 degrees and about 6.0 degrees, to help maximize beneficial effects of minimizing deformation and stress of the coupling pin receptacle 20 and stress on radius blends 23b and 39b of the cutting head 12, while preventing, as much as possible, unwanted movement of the cutting head 12 during the drilling operation.

Figure 7:
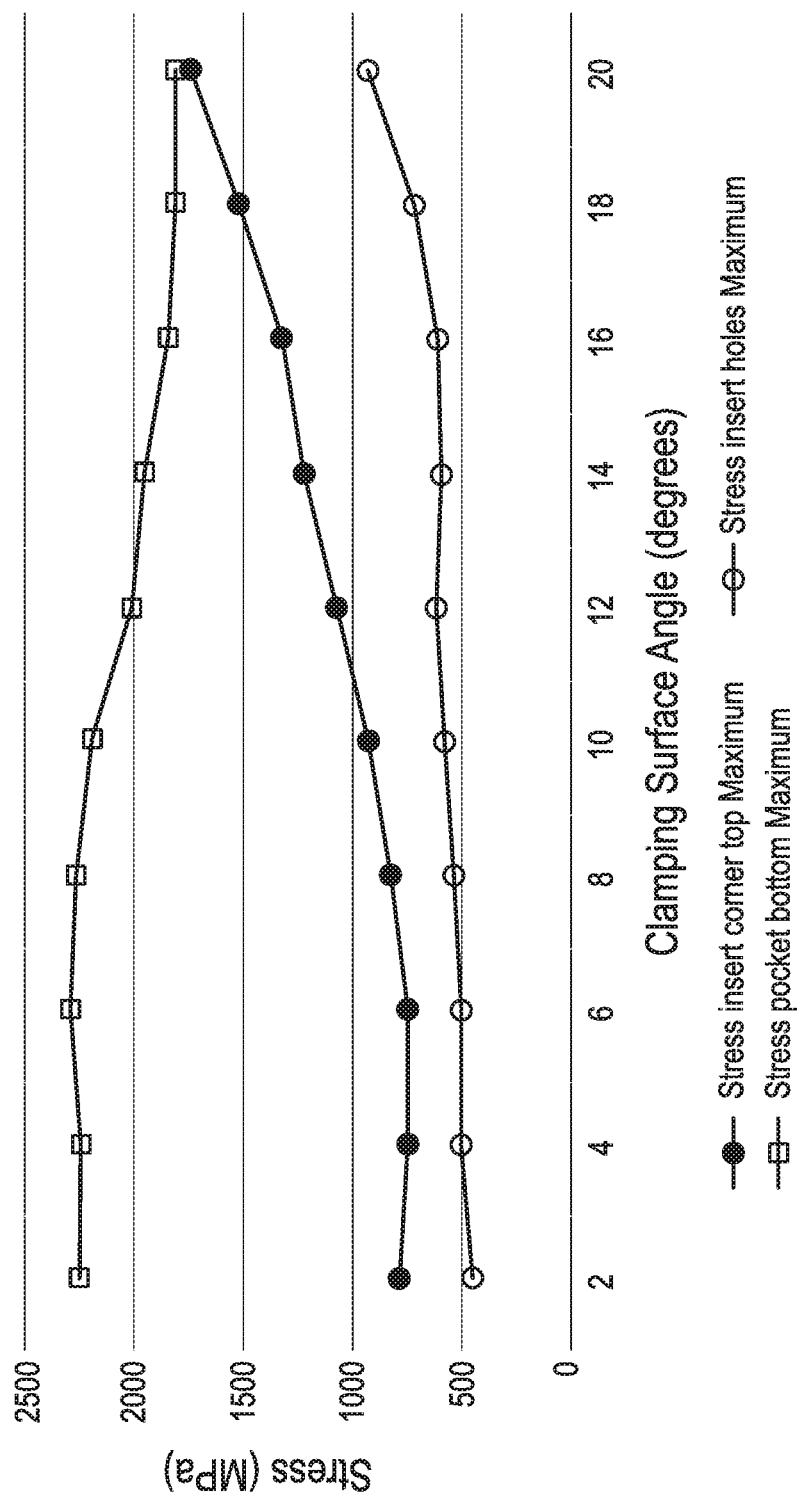
FIG. 7 is a graph showing results of a simulation of clamping surface angle versus stress at various locations on a conventional cutting head with both the clamping segments and torque segments formed at a relatively large angle of inclination with respect to the axial direction.

FIG. 7 is a graph showing results of a simulation of clamping surface angle versus stress at various locations on a conventional cutting head with both the clamping surfaces and torque surfaces being continuous (without a groove and pullout prevention surfaces), and disposed at an angle of inclination with respect to the axial of rotation 6. The angle of inclination ranges from 2 degrees to 20 degrees. Typically, the clamping surfaces and torque surfaces of the conventional cutting head are formed at an angle of inclination of between 10 degrees and 20 degrees and tapers in the direction of the drill tip.

As seen in FIG. 7, much higher stresses (2000 MPa vs. 1500 MPa) occur on the pocket at the location of the blend between the walls and the floor, where breakage is most likely to occur. In addition, the stress located on the insert corner blend between the dovetail and the clamping surfaces quickly increases as a function of the clamping surface angle and are about 50 percent higher than in rotary tools broadly contemplated herein (in accordance with at least one embodiment of the invention). As a result, the design of the conventional cutting head (which is addressed in FIG. 7) cannot be optimized with respect to minimizing stresses. Further, the stress on the coolant channels are significantly higher (600 MPa vs. 400 MPa) as compared to the stress on the coolant channels of a rotary tool as broadly contemplated herein.

The patents and publications referred to herein are hereby incorporated by reference.

Having described presently preferred embodiments the invention may be otherwise embodied within the scope of the appended claims.

What is claimed is:

1. A rotary tool extending in an axial direction along an axis of rotation, comprising:
    a support, comprising:
        a pair of opposing support structures, each support structure having an inner peripheral surface defining a coupling pin receptacle, the inner peripheral surface divided into a front receiving part and a rear receiving part, the rear receiving part comprising a circumferential groove, the front receiving part including a clamping surface and the rear receiving part including a stop surface, the support defining an external diameter, D; and
    a cutting head capable of being received in the coupling pin receptacle of the support, the cutting head comprising:
        a front cutting part defining a cutting diameter, DC;
        a coupling pin having an outer peripheral surface, the coupling pin divided into a front pin part and a rear pin part, the front pin part comprising a circumferential groove, the rear pin part including a torque surface, and the front pin part including a clamping surface; and
        a stop surface for an axial pullout prevention effective in the axial direction,
    wherein the clamping surfaces of the support and the clamping surfaces of the cutting head taper radially inward in a direction of the front cutting part.

2. The rotary tool according to claim 1, wherein the cutting head includes a pair of torque surfaces defining a distance, dx, and wherein a ratio of the distance, dx, to the external diameter, D, of the support is in a range between 0.40 and 0.65.

3. The rotary tool according to claim 1, wherein the coupling pin defines a total pin length, L3, and wherein a ratio of the total pin length, L3, to the external diameter, D, of the support is in a range between 0.30 and 0.45.

4. The rotary tool according to claim 1, wherein the stop surfaces of the support and stop surfaces of the cutting head are formed at an angle of inclination, $\alpha 1$, in a range between 30 degrees to 85 degrees with respect to the axis of rotation.

5. The rotary tool according to claim 1, wherein the clamping surfaces of the support and the clamping surfaces of the cutting head taper via being formed at an angle of inclination, $\alpha 2$, in a range between 2.5 degrees to 6.0 degrees with respect to the axis of rotation.

6. The rotary tool according to claim 1, wherein the front pin part has a front pin part length, L1, in the axial direction, and wherein the rear pin part has a rear pin part length, L2, in the axial direction, and wherein the first pin part length, L1, is identical to the second pin part length, L2.

7. The rotary tool according to claim 1, wherein the front pin part has a front pin part length, L1, and wherein the rear pin part has a rear pin part length, L2, and wherein the front pin part length, L1, differs by no more than about 0.30 to about 0.50 times the rear pin part length, L2.

8. The rotary tool according to claim 1, wherein a gap exists between the stop surfaces of the support and the stop surfaces of cutting head, and wherein a distance of the gap is greater than zero to about 1 percent of the external diameter, D, of the support.

9. The rotary tool according to claim 1, wherein the front pin part of the coupling pin defines a maximum diameter, d1, and wherein a ratio of the maximum diameter, d1, to the external diameter, D, of the support is in a range between 0.60 and 0.80.

10. A rotary tool extending in an axial direction along an axis of rotation, comprising:
a support, comprising:
a pair of opposing support structures, each support structure having an inner peripheral surface defining a coupling pin receptacle, the inner peripheral surface divided into a front receiving part and a rear receiving part, the rear receiving part comprising a circumferential groove, the front receiving part including clamping surfaces and the rear receiving part including stop surfaces, the support defining an external diameter, D; and
a cutting head capable of being received in the coupling pin receptacle of the support, the cutting head comprising:
a front cutting part defining a cutting diameter, DC;
a coupling pin having an outer peripheral surface, the coupling pin divided into a front pin part and a rear pin part, the front pin part comprising a circumferential groove, the rear pin part including torque surfaces, and the front pin part including clamping surfaces; and
stop surfaces for an axial pullout prevention effective in the axial direction,
wherein the clamping surfaces of the support and the clamping surfaces of the cutting head taper radially inward in a direction of the front cutting part at a non-zero angle of inclination, $\alpha 2$, which is in a range between 2.5 degrees to 6.0 degrees with respect to the axis of rotation, and
wherein a gap exists between the stop surfaces of the support and the support surfaces of the cutting head, and wherein a distance of the gap is greater than zero to about 1 percent of the external diameter, D, of the support.

11. The rotary tool according to claim 10, wherein the cutting head includes a pair of torque surfaces defining a distance, dx, and wherein a ratio of a distance, dx, defined by the rear pin part of the coupling pin and the external diameter, D, of the support is in a range between 0.30 and 0.45.

12. The rotary tool according to claim 10, wherein the coupling pin defines a total pin length, L3, and wherein a ratio of the total pin length, L3, to the external diameter, D, of the support is in a range between 0.30 and 0.45.

13. The rotary tool according to claim 10, wherein the rear pin part of the coupling pin defines a diameter, D1, and wherein the front pin part of the coupling pin defines a maximum diameter, d1, and wherein a ratio of the maximum diameter, d1, to the diameter, D1, is in a range between 0.60 and 0.95.

* * * * *